United States Patent
Harris et al.

(10) Patent No.: US 6,930,143 B2
(45) Date of Patent: Aug. 16, 2005

(54) ACRYLIC LATEX COMPOSITION

(75) Inventors: Stephen H. Harris, Kennett Square, PA (US); Daniel B. Pourreau, Exton, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 639 days.

(21) Appl. No.: 10/003,838

(22) Filed: Nov. 1, 2001

(65) Prior Publication Data

US 2003/0083431 A1 May 1, 2003

(51) Int. Cl.$^7$ ................................................. C08L 31/00
(52) U.S. Cl. ...................... 524/556; 524/431; 524/560; 524/561; 524/832; 524/833
(58) Field of Search ................... 524/431, 556, 524/560, 561, 832, 833

(56) References Cited

U.S. PATENT DOCUMENTS

| | | | |
|---|---|---|---|
| 4,468,498 A | * | 8/1984 | Kowalski et al. ........... 525/301 |
| 4,476,217 A | | 10/1984 | Douglas et al. ............. 430/326 |
| 4,508,812 A | | 4/1985 | Brault ........................ 430/270 |
| 5,194,510 A | | 3/1993 | DuBois ....................... 525/299 |
| 5,212,243 A | | 5/1993 | Toyoda et al. .............. 525/187 |
| 5,679,735 A | * | 10/1997 | Geissler et al. ............. 524/459 |
| 5,869,590 A | | 2/1999 | Clark et al. ................. 526/323 |
| 5,928,830 A | * | 7/1999 | Cheng et al. .......... 430/137.12 |

OTHER PUBLICATIONS

Technical Bulletin: "*tert–Butyl Methacrylate Acryester® TB, Mitsubishi Rayon*".

\* cited by examiner

*Primary Examiner*—Edward J. Cain
(74) *Attorney, Agent, or Firm*—Shao-Hua Guo

(57) ABSTRACT

An acrylic emulsion is disclosed. The emulsion comprises from about 30% to about 90% by weight of water, about 10% to about 70% by weight of an acrylic polymer, about 0.2% to about 10% by weight of a emulsifying agent, and up to 20% by weight of an organic solvent. The acrylic polymer contains from about 20% to about 80% by weight of recurring units of t-butyl acrylate or methacrylate. Latex coatings formulated from the acrylic emulsion show significantly improved resistance to moisture and corrosion.

5 Claims, No Drawings

ACRYLIC LATEX COMPOSITION

FIELD OF THE INVENTION

The invention relates to an acrylic emulsion and latex coatings therefrom. In particular, the invention relates to an acrylic emulsion that contains an acrylic polymer from t-butyl acrylate or methacrylate.

BACKGROUND OF THE INVENTION

Acrylic emulsions are known. They have been widely used in interior and exterior architectural and industrial coatings. Acrylic emulsions are usually prepared by emulsion polymerization of one or more alkyl acrylates or methacrylates. Acrylic monomers that contain a polar group are often used to stabilize the emulsion. These monomers include acrylic and methacrylic acids, and hydroxyalkyl acrylates and methacrylates. Introducing acid or hydroxyl functional groups into acrylic emulsions also makes them crosslinkable to form thermosetting coatings.

Usually, a combination of high-Tg (glass transition temperature) and low-Tg alkyl acrylates or methacrylates is used. Examples of low-Tg monomers are n-butyl acrylate ($T_g$: −54° C.), n-butyl methacrylate ($T_g$: 20° C.), and 2-ethylhexyl methacrylate ($T_g$: −10° C.). Methyl methacrylate ($T_g$: 100° C.) is the most commonly used high-Tg acrylic monomer. High-$T_g$ monomers increase the coatings' gloss and hardness, while low-$T_g$ monomers impart toughness and flexibility.

Styrene is also often incorporated into acrylic emulsions as a high-$T_g$ monomer ($T_g$: 99° C.). Styrene is inexpensive. However, styrene-containing acrylic emulsions are often sensitive to UV (ultraviolet) light, and thus they have limited uses in exterior coatings.

Acrylic emulsions have replaced solvent-based acrylics in many areas, such as automotive base coats and industrial maintenance coatings. They are more environmentally friendly because reduced amounts of VOCs (volatile organic compounds) are used. However, acrylic emulsions and coatings therefrom are sensitive to moisture, which causes the coating surface to be cloudy and the coated metal surface to rust. Thus, new acrylic emulsions and latex coatings less sensitive to moisture and corrosion are needed.

SUMMARY OF THE INVENTION

The invention is an acrylic emulsion. The emulsion comprises from about 30% to about 90% by weight of water, about 10% to about 70% by weight of an acrylic polymer, about 0.2% to about 10% by weight (based on polymer) of an emulsifying agent, and up to 20% by weight of an organic solvent. The acrylic polymer contains from about 20% to about 80% by weight of recurring units of t-butyl acrylate (TBA) or methacrylate (TBMA).

The invention also includes a process for making an acrylic emulsion. The process comprises charging a reactor with water, an emulsifying agent, an initiator, and a portion of a monomer mixture, polymerizing the reactor contents to form a seed emulsion, and then gradually adding the remaining monomer mixture into the seed emulsion. The monomer mixture contains from about 20% to about 80% by weight of TBA or TBMA.

The invention includes a latex coating formulated from the acrylic emulsion. The coating shows significantly improved resistance to moisture and corrosion.

DETAILED DESCRIPTION OF THE INVENTION

Acrylic emulsions of the invention comprise from about 30% to about 90% by weight of water. Water forms the continuous phase of the emulsion. Preferably, the water content is from about 40% to about 60% by weight.

The emulsion contains from about 10% to about 70% of an acrylic polymer. The acrylic polymer contains from about 20% to about 80% by weight of recurring units of t-butyl acrylate (TBA) or methacrylate (TBMA). Preferably, the content of the TBA or TBMA recurring units is from about 30% to about 70% by weight.

TBA and TBMA are high-Tg monomers. Poly(TBA) and poly(TBMA) have Tgs of 73° C. and 107° C., respectively, which are substantially higher than the Tgs of poly(n-butyl methacrylate) (Tg: 20° C.) and poly(n-butyl acrylate) (Tg: −54° C.). Very few high-Tg alkyl acrylates or methacrylates are available. Methyl methacrylate (Tg: 105° C.) is the most commonly used high-Tg monomer in acrylic emulsions. It is known that poly(TBMA) has lower solution viscosity than poly(MMA). Thus, it has been suggested to substitute TBMA for MMA in high-solids acrylic resins. See *Technical Bulletin: "tert-Butyl Methacrylate—Acryester® TB, Mitsubishi Rayon."* We have surprisingly found that incorporating TBMA into acrylic emulsions can significantly enhance the resistance of latex coatings to moisture and corrosion.

The acrylic polymer contains from about 1% to about 20% by weight of recurring units of acrylic or methacrylic acid. Acid-functional monomers are used to stabilize the emulsion. However, if the acid content is too high, the acrylic emulsion and coatings therefrom are sensitive to moisture and corrosion. Preferably, the acid monomer content is from about 1% to about 15% by weight. More preferably, the acid content is from about 5% to about 10% by weight.

The acrylic polymer also contains up to 79% of recurring units of a third monomer. Preferably, the third monomer is selected from the group consisting of $C_1$ to $C_{10}$ alkyl acrylates and methacrylates, vinyl halides, vinyl ethers and esters, unsaturated nitriles, vinylidene halides, and the like, and mixtures thereof. Incorporating a third monomer can balance the cost and optimize the properties of the emulsion and latex coatings therefrom.

More preferably, the third monomer is a low-Tg, $C_1$ to $C_{10}$ alkyl acrylate or methacrylate ($T_g$ below 25° C.). The combination of TBA or TBMA and a low-Tg acrylate or methacrylate balances the hardness and flexibility of the emulsion polymer and coatings therefrom. Examples of suitable low-Tg alkyl acrylates and methacrylates include n-butyl acrylate, n-butyl methacrylate, lauryl acrylate, lauryl methacrylate, tridecyl acrylate, tridecyl methacrylate, 2-ethylhexyl acrylate, 2-ethylhexyl methacrylate, and the like, and mixtures thereof.

One advantage of the invention is that no vinyl aromatic monomer, such as styrene, is needed in the acrylic polymer. The acrylic emulsion and latex coatings therefrom show excellent moisture resistance even without incorporating any vinyl aromatics. Therefore, the acrylic emulsion and latex coating therefrom should have not only improved moisture resistance but also improved UV resistance compared to conventional acrylic emulsions.

The acrylic emulsion contains from about 0.2% to about 10% by weight of an emulsifying agent. Suitable emulsifying agents include anionic and nonionic surfactants. Examples of non-ionic surfactants are sorbitan esters such as sorbitan monooleate, sorbitan monolaurate, polyvinyl alcohol, and poly(ethylene oxide). Examples of anionic surfactants are sodium and potassium stearates, laurates and palmitates, sodium lauryl sulfate, and sodium dodecylbenzene sulfonate. Anionic surfactants are preferably used in an amount within the range of about 0.2 to about 2% by weight, while nonionic surfactants are preferably used in an amount within the range of about 1% to about 10% by weight. Increasing the amount of surfactant increases particle number and decreases particle size. Preferably, surfactants are used in an amount effective to produce an emulsion having a particle size within the range of about 50 to about 250 nm.

Optionally, organic solvents are used in the emulsion. Organic solvents stabilize emulsions and function as coalescing agents in the latex coatings therefrom. Suitable organic solvents include ethers, esters, ketones, glycol ether esters, lactams, and the like, and mixtures thereof. Examples are methanol, ethanol, isopropyl alcohol, acetone, ethylene glycol methyl ether, and the like, and mixtures thereof. Organic solvents are used in an amount up to 20% by weight of the emulsion.

The acrylic emulsion of the invention can be prepared by emulsion polymerization. One process for preparing the latex involves charging a reactor with the amounts needed of water, surfactant, initiator, and a portion of monomer mixture, and heating the reactor contents to the desired polymerization temperature to form a "seed" emulsion. The remaining monomer mixture is then gradually added into the seed emulsion. Suitable monomers are discussed above. The process is advantageous in forming a uniform and stable emulsion. The gradual addition of monomer mixture makes it easier to control the reaction temperature.

Initiators suitable for emulsion polymerization are water-soluble initiators, such as potassium and sodium persulfates, and hydrogen peroxide. Partially water-soluble peroxides such as t-butyl hydroperoxide, and succinic acid peroxide, and azo compounds can also be used. A redox system, i.e., an initiator plus a reducing agent, is preferably used. An example of a redox system is persulfate with ferrous ion. Suitable reducing agents also include sodium bisulfite, sodium hydrosulfite, and sodium formaldehyde sulfoxylate. Redox systems are advantageous in yielding desirable initiation rates at a low temperature.

The polymerization is preferably performed at a temperature within the range of about −50° C. to about 100° C. More preferably the temperature is within the range of about 25° C. to about 90° C. When a redox initiator system is used, the temperature can be relatively low.

Alternatively, the emulsion of the invention is prepared by emulsifying a pre-prepared acrylic polymer in water in the presence of an emulsifying agent and an optional organic solvent. Suitable emulsifying agents and organic solvents are discussed above. The pre-prepared acrylic polymer has essentially the same composition as made in the emulsion polymerization. However, the pre-prepared acrylic polymer preferably has an acid number greater than about 2 mg KOH/g. More preferably, it has an acid number greater than about 5 mg KOH/g. Most preferably, it has an acid number greater than about 8 mg KOH/g. The emulsion is preferably prepared by slowly adding an acrylic polymer into water. The emulsifying process is performed preferably with high-speed mixing (2,000 to 5,000 revolutions per minute) and preferably at a temperature within the range of about 40° C. to about 70° C., more preferably 45° C. to 55° C.

When emulsifying a pre-prepared acrylic polymer, a neutralizing agent can be used. Useful neutralizing agents are preferably selected from alkali and alkaline earth metal hydroxides, ammonia, and organic amines. Tertiary amines are more preferred. Examples of neutralizing agents are sodium hydroxide, potassium hydroxide, magnesium hydroxide, triethylamine, trimethylamine, diethanolamine, triethanolamine, N,N-dimethylethanolamine, and the like, and mixtures thereof. Neutralizing agents are used in an amount sufficient to convert at least some of the acid groups to their salts.

Emulsion polymerization usually produces high molecular weight polymers (Mn usually greater than 10,000), which are suitable for formulating thermoplastic acrylic coatings. The emulsion can be applied directly onto a surface, and a coating film forms when water and optional solvents evaporate. Alternatively, the acrylic emulsion is mixed with pigments such as titanium dioxide, to form pigmented coatings. Organic solvents are optionally added to the coating formulation to accelerate water evaporation. Suitable organic solvents are discussed above. Organic solvents are usually used in an amount less than 20% by weight of the total coating formulation. Thermoplastic acrylic coatings are particularly useful for household paints.

Pre-prepared polymers can be made by any known methods, e.g., solution polymerization. The polymer is isolated from the solution before use. Emulsifying pre-prepared polymers usually involves with low molecular weight polymers (Mn usually less than 10,000). Crosslinkers are used in the formulation. A coating is applied to a surface. Film forms after water and solvent evaporate. Crosslinking occurs when the film is heated. Suitable crosslinkers include blocked polyisocyanates and melamine compounds. When a blocked polyisocyanate crosslinker is used, the product is an acrylic-urethane coating; when a melamine crosslinker is used, the product is an acrylic-melamine coating. Suitable melamine compounds for use in making coatings of the invention include commercial grade hexamethoxymethylmelamines, such as, for example, CYMEL 303, CYMEL 370 and CYMEL 325 crosslinkers (products of Cytec).

The following examples merely illustrate the invention. Those skilled in the art will recognize many variations that are within the spirit of the invention and scope of the claims.

EXAMPLE 1

Emulsion Prepared from t-Butyl Methacrylate

Emulsion Preparation

Water (615 g), TBMA (90 g), 2-ethylhexyl acrylate (80 g), ammonium persulfate (1.24 g), dodecylbenzene sulfonate sodium salt (8.26 g), and sodium bicarbonate (2.10 g) are added to a one-liter reaction kettle. The reactor contents are purged with nitrogen and heated to 80° C. for one hour to form a seed emulsion. A mixture of ammonium persulfate (2.1 g), sodium bicarbonate (3.56 g), and water (60 g) is then added to the reactor. A mixture of TBMA (120 g), 2-ethylhexyl acrylate (77 g), butyl methacrylate (158 g), and acrylic acid (26.1 g) is gradually fed into the reactor over 4 hours with rapid mixing. After the addition is complete, an additional one gram of ammonium persulfate is added and the reaction continues for an additional hour to yield an emulsion. Ammonium hydroxide is added to the emulsion to a pH value 8–9. The emulsion is then filtered through a 75-micron screen to remove grit. The product has 45% solids and a particle size of 163 nm in diameter.

Coating Formulation

The above prepared emulsion (25 g), Texanol™ solvent (product of Texaco, 1.25 g, and water (3 g) are mixed. The solution is allowed to sit overnight to equilibrate. It is then applied onto Bonderite treated steel panels using a 5 mil Bird bar. The panels are allowed to dry for seven days. Cleveland Humidity testing, ASTM D2247, of the panels is then performed. After 24 hours of continuous humidity exposure, the coated panels show virtually no corrosion and the coating films lose no gloss.

COMPARATIVE EXAMPLE 2

Emulsion Prepared from Methyl Methacrylate

The procedure of Example 1 is repeated but MMA replaces TBMA. After 4 hours of continuous humidity exposure, the coated panels are corroded and the coating films lose gloss.

We claim:

1. A latex coating comprising
  (a) from about 30% to about 90% by weight of water;
  (b) from about 10% to about 70% by weight of an acrylic polymer that consists essentially of 20% to 80% by weight of recurring units of t-butyl acrylate or methacrylate, 1% to 20% by weight of recurring units of acrylic or methacrylic acid, and up to 79% of recurring units of a $C_1$–$C_{10}$ alkyl acrylate or methacrylate having a Tg lower than 25° C.;
  (c) from about 0.2% to about 10% by weight of a emulsifying agent;
  (d) up to 20% by weight of an organic solvent;
  (e) up to 60% by weight of a pigment; and
  (f) from 1 to 30% by weight of a crosslinker,
  wherein the coating has improved moisture and corrosion resistance.

2. The latex coating of claim 1 wherein the acrylic polymer has an acid number greater than about 2 mg KOH/g.

3. The latex coating of claim 1 wherein the organic solvent is an alcohol.

4. The latex coating of claim 1 wherein the pigment is titanium dioxide.

5. The latex coating of the claim 1 wherein the crosslinker is a melamine compound or a blocked isocyanate.

* * * * *